(12) United States Patent
Schleich

(10) Patent No.: US 10,228,048 B2
(45) Date of Patent: Mar. 12, 2019

(54) VEHICLE TRANSMISSION WITH MULTIPLE GEAR RATIOS

(71) Applicant: Bayerische Motoren Werke Aktiengesellschaft, Munich (DE)

(72) Inventor: Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/454,266

(22) Filed: Mar. 9, 2017

(65) Prior Publication Data

US 2017/0191554 A1   Jul. 6, 2017

Related U.S. Application Data

(63) Continuation of application No. PCT/EP2015/075952, filed on Nov. 6, 2015.

(30) Foreign Application Priority Data

Nov. 25, 2014   (DE) .................. 10 2014 223 918

(51) Int. Cl.
  *F16H 37/04*   (2006.01)
  *F16H 3/66*   (2006.01)
  *F16H 3/44*   (2006.01)

(52) U.S. Cl.
  CPC .............. *F16H 37/04* (2013.01); *F16H 3/66* (2013.01); *F16H 3/663* (2013.01); *F16H 3/666* (2013.01);
  (Continued)

(58) Field of Classification Search
  None
  See application file for complete search history.

(56) References Cited

U.S. PATENT DOCUMENTS

2001/0012810 A1   8/2001   Ohkubo
2005/0215389 A1   9/2005   Shimizu et al.
(Continued)

FOREIGN PATENT DOCUMENTS

CN   1620565 A   5/2005
CN   1963258 A   5/2007
(Continued)

OTHER PUBLICATIONS

International Search Report (PCT/ISA/210) issued in PCT Application No. PCT/EP2015/075952 dated Feb. 9, 2016 with English translation (five pages).
(Continued)

*Primary Examiner* — Dirk Wright
(74) *Attorney, Agent, or Firm* — Crowell & Moring LLP

(57) ABSTRACT

A vehicle transmission with multiple gear ratios includes a spur-gear gearbox with a first spur gear and a second spur gear arranged on a spur-gear shaft, wherein the first spur gear meshes with a fourth spur gear and the second spur gear meshes with a third spur gear, and an epicyclic gear train with a first and a second epicyclic gear sets and a epicyclic gear train shaft. Each of the epicyclic gear sets has a ring gear and at least one epicyclic gear, and at least one of the epicyclic gear sets has a sun gear and at least one planet carrier. A gear box, the spur-gear shaft and the epicyclic gear train shaft are rotatably mounted relative to the gear box. A plurality of speed changing devices are provided, wherein the first spur gear can be selectively connected in a torque-transmitting manner to the spur-gear shaft. The vehicle transmission is characterized in that the first spur gear can be selectively connected in a torque-transmitting manner to the gear box, at least one of the sun gears can be selectively connected in a torque-transmitting manner to the gear box,
(Continued)

and the third spur gear can be selectively connected in a torque-transmitting manner to one of the planet carriers.

18 Claims, 3 Drawing Sheets

(52) U.S. Cl.
CPC .. *F16H 2003/445* (2013.01); *F16H 2037/048* (2013.01); *F16H 2200/0056* (2013.01); *F16H 2200/2005* (2013.01); *F16H 2200/2007* (2013.01); *F16H 2200/2023* (2013.01); *F16H 2200/2048* (2013.01); *F16H 2200/2064* (2013.01); *F16H 2200/2094* (2013.01)

(56) References Cited

U.S. PATENT DOCUMENTS

| | | |
|---|---|---|
| 2006/0079368 A1 | 4/2006 | Hemphill et al. |
| 2007/0111839 A1 | 5/2007 | Choi |
| 2010/0029433 A1 | 2/2010 | Tenberge |
| 2015/0045174 A1 | 2/2015 | Beck et al. |
| 2015/0087469 A1 | 3/2015 | Beck |
| 2016/0017959 A1 | 1/2016 | Beck |
| 2017/0198791 A1* | 7/2017 | Schleich ................ F16H 37/04 |
| 2017/0254391 A1* | 9/2017 | Schleich ................. F16H 3/66 |

FOREIGN PATENT DOCUMENTS

| | | |
|---|---|---|
| CN | 104136807 A | 11/2014 |
| DE | 101 05 682 A1 | 9/2001 |
| DE | 10 2007 014 150 A1 | 9/2008 |
| DE | 10 2010 061 402 A1 | 6/2012 |
| DE | 10 2012 001 846 A1 | 8/2013 |
| DE | 10 2012 207 028 A1 | 10/2013 |
| DE | 10 2012 221 073 A1 | 5/2014 |
| EP | 1647736 A2 | 4/2006 |

OTHER PUBLICATIONS

German-language Written Opinion (PCT/ISA/237) issued in PCT Application No. PCT/EP2015/075952 dated Feb. 9, 2016 (18 pages).
German Office Action issued in counterpart German Application No. 10 2014 223 918.4 dated Mar. 16, 2016 (four pages).
Chinese-language Office Action issued in counterpart Chinese Application No. 201580049694.0 dated Jun. 26, 2018 with English translation (14 pages).

* cited by examiner

| | Shift diagram: | | | | | | |
|---|---|---|---|---|---|---|---|
| | 1.SE | 2.SE | 3.SE | 4.SE | 5.SE | 6.SE | 7.SE |
| Gearspeed R | ▨ | ▨ | | | | | |
| Gearspeed 1 | | | ▨ | ▨ | | | |
| Gearspeed 2 | | ▨ | ▨ | | | | |
| Gearspeed 3 | | | ▨ | | ▨ | | |
| Gearspeed 4 | | | ▨ | | | ▨ | |
| Gearspeed 5 | | | | | ▨ | | ▨ |
| Gearspeed 6 | | | | | | ▨ | ▨ |
| Gearspeed 7 | | | | ▨ | | | ▨ |

| | Shift Diagram : | | | | | | |
|---|---|---|---|---|---|---|---|
| | 1.SE | 2.SE | 3.SE | 4.SE | 5.SE | 6.SE | 7.SE |
| Gearspeed R | ▨ | ▨ | | | | | |
| Gearspeed 1 | | | ▨ | ▨ | | | |
| Gearspeed 2 | | ▨ | ▨ | | | | |
| Gearspeed 3 | | | ▨ | | ▨ | | |
| Gearspeed 4 | | | ▨ | | | ▨ | |
| Gearspeed 5 | | | | | ▨ | | ▨ |
| Gearspeed 6 | | | | | | ▨ | ▨ |
| Gearspeed 7 | | | | ▨ | ▨ | | |

| | Shift Diagram ; | | | | | | |
|---|---|---|---|---|---|---|---|
| | 1.SE | 2.SE | 3.SE | 4.SE | 5.SE | 6.SE | 7.SE |
| Gearspeed R | ▨ | ▨ | | | | | |
| Gearspeed 1 | | | ▨ | ▨ | | | |
| Gearspeed 2 | | ▨ | ▨ | | | | |
| Gearspeed 3 | | | ▨ | | ▨ | | |
| Gearspeed 4 | | | ▨ | | | ▨ | |
| Gearspeed 5 | | | | | ▨ | | ▨ |
| Gearspeed 6 | | | | | | ▨ | ▨ |
| Gearspeed 7 | | | | ▨ | ▨ | | |

VEHICLE TRANSMISSION WITH MULTIPLE GEAR RATIOS

CROSS REFERENCE TO RELATED APPLICATIONS

This application is a continuation of PCT International Application No. PCT/EP2015/075952, filed Nov. 6, 2015, which claims priority under 35 U.S.C. § 119 from German Patent Application No. 10 2014 223 918.4, filed Nov. 25, 2014, the entire disclosures of which are herein expressly incorporated by reference.

BACKGROUND AND SUMMARY OF THE INVENTION

The invention relates to a combined gearbox having multiple shiftable transmission ratios. A multi-gearspeed vehicle gearbox of this type is known from DE 10 2012 207 028 A1.

Below, the invention will be described on the basis of a shift gearbox for a passenger motor vehicle, but this is not to be understood as a restriction of the invention.

In motor vehicles, space conditions are becoming restricted in particular owing to the increasing number of secondary and auxiliary assemblies, and this results in the requirement to use particularly compact components with simultaneously high functionality. For shift gearbox devices, regardless of whether they are designed to be manually actuable, automatable or so as to shift automatically, there is furthermore the requirement to provide an adequate gearbox spread (ratio, transmission ratio of lowest gear/transmission ratio of highest gear). In the past, to be able to realize a large gearbox spread in a small structural space, combined shift gearboxes, in particular a combination of an epicyclic gearbox with a spur-gear gearbox, have proven to be a suitable approach.

DE 10 2012 207 028 A1 discloses a combined shift gearbox of said type (epicyclic (planetary) gearbox, axially parallel spur-gear gearbox) in the form of a multi-stage gearbox that can perform shifts under load. Here, the gearbox is driven by way of the sun pinion shaft of the epicyclic gearbox, wherein said epicyclic gearbox is composed of two planetary gear sets and the transmission ratio thereof can be varied by way of a multiplicity of brakes and clutches. The epicyclic gearbox is, in particular in order to broaden the spread, combined with a spur-gear gearbox, by way of which drive is output from the combined shift gearbox device.

It is an object of the invention to provide a combined vehicle gearbox with a small structural space requirement.

This and other objects are achieved by way of a combined vehicle gearbox in accordance with embodiments of the invention.

In the context of the invention, a vehicle gearbox is to be understood to mean a gearbox device which has multiple discrete transmission ratios (ratio, drive input rotational speed to drive output rotational speed). Said transmission ratios are preferably settable or shiftable selectively, in particular in discrete stages, by way of a multiplicity of shift devices. It is furthermore preferable for a gearbox of said type to be provided for longitudinal installation, and preferably for transverse installation. Here, in this context, longitudinal installation is to be understood to mean that a spur-gear shaft of the multi-stage gearbox is oriented parallel to the main direction of travel of the vehicle, and transverse installation is to be understood in particular to mean that a spur-gear shaft is arranged transversely, preferably orthogonally, with respect to said direction.

In this context, a vehicle gearbox or multi-gearspeed gearbox is to be understood to mean a shift gearbox device for a passenger motor vehicle, having a multiplicity of, preferably five or more, preferably six or more and particularly preferably seven or more, forward gearspeeds and one or more reverse gearspeeds. In this context, a gearspeed is to be understood to mean a discrete transmission ratio of said gearbox device. Said vehicle gearbox has in particular at least two sub-gearboxes, of which a first sub-gearbox is a spur-gear gearbox with two shafts arranged axially parallel with respect to one another, and a second gearbox which is in the form of an epicyclic gearbox.

In the context of the invention, a spur-gear gearbox is to be understood to mean a gearbox device which has, in particular, externally toothed spur gears, wherein said spur gears are arranged on axes of rotation which are axially parallel to one another. In the context of the invention, a spur gear is to be understood to mean an at least substantially cylindrical gearwheel with a toothing arranged on the outside on the cylinder for the purposes of transmitting motion and power, wherein said toothing is preferably to be understood to mean a straight or preferably helical toothing.

A spur-gear gearbox preferably has at least one first and one second spur gear arranged on a spur-gear shaft. It is furthermore preferable for said two spur gears (first, second spur gear) to mesh with two further spur gears (third, fourth spur gear) which are arranged on an axis of rotation which is axially parallel with respect to the spur-gear shaft. The spur-gear shaft is preferably designed as a gearbox input shaft. Here, the spur gears are arranged in pairwise fashion (first/third, second/fourth) such that in each case two spur gears on different shafts (spur-gear shaft, a further shaft) are in contact, or mesh with one another, in their toothing region for the purposes of transmitting power or motion.

In the context of the invention, an epicyclic gearbox (also referred to as a planetary gear train) is to be understood to be a gearbox device having at least one internal gear, at least one planet gear which meshes with said internal gear, and at least one sun gear which meshes with said planet gear, and also a planet gear carrier designed for the mounting of the planet gear. Said epicyclic gearbox is preferably arranged concentrically with respect to said axis of rotation. A combination of a sun pinion, an internal gear, at least one planet gear and a planet gear carrier may also be understood to be a planetary gear set. It is furthermore possible for a planetary gear set to be understood to be a so-called reduced planetary gear set having no sun pinion or alternatively no internal gear. Use is preferably made of a combination of a first (complete) planetary gear set and a second, reduced planetary gear set.

The epicyclic gearbox preferably has at least one first and one second planetary gear set. It is furthermore preferable for drive to be output from the epicyclic gearbox by way of an epicyclic gearbox shaft, with it furthermore being preferable for said epicyclic gearbox shaft to be concentric with respect to the axis of rotation (axially parallel with respect to the spur-gear shaft) of the spur-gear gearbox. One of the planetary gear sets of the epicyclic gearbox is preferably to be understood to be a reduced planetary gear set. The epicyclic gearbox is preferably arranged entirely or at least partially concentrically with respect to said axis of rotation of the spur-gear gearbox. It is preferable for individual gearbox elements (sun pinion, planet gear, planet gear carrier, internal gear) of the first planetary gear set to be connectable to gearbox elements (sun pinion, planet gear, planet gear carrier, internal gear) of the second planetary gear set. The gearbox elements may be connectable either permanently, that is to say preferably non-detachably during intended operation of the vehicle gearbox, or selectively, in particular for variation of the kinematic ratios of the vehicle gearbox. In particular, different discrete transmission ratios can be set by way of the selective connection of different gearbox elements.

The epicyclic gearbox is preferably to be understood to be a combination of said first (complete) planetary gear set and said second, reduced planetary gear set. It is furthermore preferable for said epicyclic gearbox to be understood to be a so-called Ravigneaux gear set. In the context of the invention, a Ravigneaux set is to be understood to be an epicyclic gearbox in which two planet gears which mesh with one another are rotatably mounted on a common planet gear carrier, and furthermore, said Ravigneaux set has a first and a second sun pinion, but only one internal gear. In particular, by way of a reduced planetary gear set, it is possible to realize a particularly compact construction of the gearbox device.

In the context of the invention, a gearbox housing is to be understood to mean a device which is provided for accommodating the spur-gear gearbox and the epicyclic gearbox; in particular, the spur-gear shaft and the epicyclic gearbox shaft are mounted so as to be rotatable relative to the gearbox housing. It is furthermore preferable for the gearbox housing to be designed for accommodating a lubricant.

In the context of the invention, a shift device is to be understood to mean a device for the positively locking, non-positively locking or positively/non-positively locking connection of two parts, components or devices to one another, and furthermore, by way of said shift device, a force or a torque can be selectively transmitted between said two components. A shift device is preferably to be understood to mean a device which is selected from a group, wherein said group has at least the following elements:

synchronization device, in particular conical synchronization,
multiplate clutch or brake,
shoe-type brake or clutch,
toothed coupling,
sliding-sleeve device.

In this context, a shift device is preferably to be understood to mean a device for connecting in particular one of the gearwheels, one of the shafts, the planet gear carrier or the gearbox housing to in particular a further one of the gearwheels, the shafts, the planet gear carrier or the gearbox housing. It is preferable for a shift device to form at least one friction pairing by way of, in particular, friction plates or friction cones, or preferably a positively locking connection, in particular by way of claws, hooks, toothings or a sliding sleeve.

It is furthermore preferable for at least one of said shift device, preferably multiple and particularly preferably all, to be designed such that the forces/torques can be transmitted between the components designed for the coupling action, preferably at least partially or preferably entirely in non-positively locking fashion. In particular, shift devices with at least partially non-positively locking torque transmission permit comfortable shifting of the vehicle gearbox and/or shifting of the vehicle gearbox under load (shifting without an interruption in traction power), and it is thus possible to realize an improved gearbox.

It is preferably the case that a shift device has a combination of at least two of the devices mentioned above, preferably a sliding sleeve with at least one friction cone or at least one friction plate.

In the context of the invention, selective connection in torque-conducting fashion is to be understood to mean that two components, in particular shafts, gearwheels or sections of the gearbox housing, are, by actuation of a shift device, connectable to one another such that a torque can be transmitted between the parts that are connected to one another (shift device activated).

Such a selective connection can be released by way of the shift device, such that, in this case, no torque can be transmitted between said two parts (shift device deactivated).

Tests have shown that, in the case of combined multi-gearspeed vehicle gearboxes, a particularly compact construction can be achieved in particular if the first spur gear is selectively connectable in torque-conducting fashion to the gearbox housing. It is thus possible in a particularly simple manner for a rotational speed of zero to be predefined for at least some of the gearwheels, in particular at least one of the planetary gear sets (first spur gear, fourth spur gear).

In a preferred embodiment of the vehicle gearbox, the spur-gear shaft and the epicyclic gearbox shaft are designed for power transmission from and to the vehicle gearbox. Here, in the context of the invention, power transmission from and to the vehicle gearbox is to be understood to mean that drive power (torque, rotational speed) can be supplied to the gearbox from an outside source, in particular from a drive machine such as a reciprocating-piston engine. Furthermore, such drive power (rotational speed, torque) can be output to outside the gearbox, in particular to at least one driven wheel of the motor vehicle. The spur-gear shaft and the epicyclic gearbox shaft are preferably to be understood to be the gearbox input shaft and gearbox output shaft and vice versa. The spur-gear shaft and the epicyclic gearbox shaft are preferably arranged incongruently with respect to one another, and are furthermore preferably arranged so as to be radially spaced apart from one another and axially parallel to one another. Tests have shown that, in an embodiment in which the gearbox input shaft is in the form of a spur-gear shaft and the gearbox output shaft is in the form of an epicyclic gearbox shaft, particularly compact dimensions of the vehicle gearbox can be realized.

In a preferred embodiment, the spur-gear shaft and the epicyclic gearbox shaft are to be understood to be two axially parallel gearbox shafts; in particular, said two gearbox shafts are arranged incongruently with respect to one another. In particular owing to the incongruent arrangement of the spur-gear shaft and the epicyclic gearbox shaft, a nested configuration of the vehicle gearbox is made possible, and thus a particularly compact construction of said gearbox can be realized.

In a preferred embodiment, the third spur gear, which meshes in particular with the second spur gear arranged on the spur-gear shaft, is selectively connectable in torque-conducting fashion to at least one of the sun pinions/sun gear, or to one of the sun pinion shafts. For this purpose, the third spur gear is preferably contactable by a shift device, and it is furthermore preferable for a further gearwheel, component, shaft or the gearbox housing to be connectable by way of said shift device to the third spur gear. It is furthermore preferable for the third spur gear to be connectable to at least one of the sun pinions/sun gears, or to one of the sun pinion shafts. In particular by way of the connection of the third spur gear to one of said sun pinions, simple and compact shifting of the vehicle gearbox is made possible.

In a preferred embodiment of the multi-gearspeed vehicle gearbox, the third spur gear is selectively connectable in torque-conducting fashion to an internal gear of the first planetary gear set. To produce said connection, the shift device is preferably designed such that, by means thereof, the third spur gear is connectable either to one of the sun gears/pinions or to said internal gear. In particular, by way of this connectability of the third spur gear, said third spur gear can be utilized for different transmission ratios (a first transmission ratio, coupling of third spur gear and sun pinion, a second transmission ratio, coupling of third spur gear and internal gear of the first planetary gear set), and thus a particularly compact construction of the gearbox can be realized.

In a preferred embodiment, said third spur gear is selectively connectable in torque-conducting fashion to one of the planet gear carriers of the first or second planetary gear set or to a common planet gear carrier of both gear sets. In particular, by way of this connectability of the third spur gear to the planet gear carrier, further utilization of said spur gear (additional gearspeed) is made possible, the rotational speed difference between third spur gear and planet gear carrier can selectively be zero, and the vehicle gearbox can be made more compact.

It is preferable for both the internal gear of the first planetary gear set and the sun pinion of the first planetary gear set or the sun gear of the first planetary gear set to be arranged concentrically or coaxially with respect to the epicyclic gearbox shaft. It is furthermore preferable for the sun pinion shaft or the sun gear of the second, in particular reduced, planetary gear set to be understood to be an epicyclic gearbox shaft. It is preferable for the second planetary gear set to have at least one second planet gear, but preferably a multiplicity of second planet gears. It is preferable for the second planetary gear set to be a reduced planetary gear set, and to have no dedicated internal gear, or preferably no dedicated sun gear/pinion.

In a preferred embodiment, said third spur gear is selectively connectable in torque-conducting fashion to the gearbox housing. In particular, by way of this connectability of the third spur gear to the gearbox housing, further utilization of said spur gear is made possible, it is possible for a rotational speed of zero to be predefined, and the vehicle gearbox can be made more compact.

In a preferred embodiment, three of the following gearbox elements are selectively connectable in torque-conducting fashion to the gearbox housing:
  first spur gear, arranged on spur-gear shaft;
  first or second sun gear/pinion;
  first or second planet gear carrier;
  first or second internal gear.

It has been found that, in particular with the connection of three gearbox elements to the gearbox housing, a particularly compact structural form can be realized. In a preferred embodiment, the first spur gear, the third spur gear and the first internal gear are selectively connectable in torque-conducting fashion to the gearbox housing. In a preferred embodiment, the first spur gear, the third spur gear and the planet gear carrier of the first planetary gear set, in particular the common planet gear carrier of the first and second planetary gear sets, are selectively connectable in torque-conducting fashion to the gearbox housing. In a preferred embodiment, the first spur gear, the third spur gear and the planet gear carrier of the second planetary gear set, said planet gear carrier in particular being couplable to the internal gear of the first planetary gear set, are selectively connectable in torque-conducting fashion to the gearbox housing.

In a preferred embodiment, at least one of the planetary gear sets (first, second) has a further, so-called plus planet gear or multiple further plus planet gears. With a plus planet gear of said type, the direction of rotation of the planetary gear set can be reversed. The plus planet gear preferably meshes at one side with one of the planet gears and at the other side with the internal gear or with the sun gear/pinion, whereas the planet gear meshes with the sun gear/pinion or the internal gear. The plus planet gear is in particular mounted on the same planet gear carrier as the planet gear with which it meshes. It is furthermore preferable for both planetary gear sets to have at least one or more plus planet gears. In particular, by way of plus planet gears, the kinematic ratios in the epicyclic gearbox can be influenced in the desired manner.

In a preferred embodiment, the first planetary gear set has at least one first planet gear and the second planetary gear set has at least one second planet gear. Said first planet gear preferably meshes with said second planet gear. It is furthermore preferable for said first planet gear to mesh with at least one gearwheel of the first planetary gear set, preferably with the internal gear or with the sun gear/pinion. It is preferable for said second planet gear to mesh with at least one gearwheel of the second planetary gear set, in particular with the internal gear or with the sun gear/pinion, preferably with both. Said first planetary gear set is preferably a reduced planetary gear set; said gear set preferably has an internal gear, a planet gear carrier and at least one first planet gear, and said gear set is preferably composed of these. It is furthermore preferable for said first and said second planet gear to be mounted rotatably on a common planet gear carrier. In particular, by way of a first and a second planet gear which mesh with one another, it is possible in a particularly simple and compact manner for drive power to be transmitted between the planetary gear sets, and an improved vehicle gearbox can thus be realized.

In a preferred embodiment, at least one of the planet gear carriers of the first or second planetary gear set, preferably a common planet gear carrier, is selectively connectable in torque-conducting fashion to the gearbox housing. In particular by way of the connection of one of the planet gear carriers to the gearbox housing, it is possible in a particularly simple manner for the transmission ratio of the vehicle gearbox to be influenced, and a particularly compact construction of the gearbox is made possible.

It is preferable for at least one planet gear to be mounted on the planet gear carrier by way of a plain bearing arrangement, preferably by way of a rolling bearing arrangement. It is preferable for a multiplicity of said planet gears to be mounted on the planet gear carrier in this way, and it is preferable for all planet gears to be mounted by plain bearings, particularly preferably by rolling bearings.

An epicyclic gearbox with a first planetary gear set and a second planetary gear set, of which at least one is a reduced planetary gear set, may be regarded as a so-called Ravigneaux gear set, and this in particular results in a particularly compact construction of the vehicle gearbox.

In a preferred embodiment, at least one of the internal gears of the first or second planetary gear set, preferably both internal gears, is or are selectively connectable in torque-conducting fashion to the gearbox housing. It is preferable for the first internal gear, that is to say the internal gear of the first planetary gear set, to be connectable to the gearbox housing. In particular by way of the connection of one of the internal gears, a particularly compact construction of the vehicle gearbox is made possible.

In a preferred embodiment of the vehicle gearbox, the first spur gear meshes with a fourth spur gear, and said fourth spur gear is connectable to the internal gear of the first planetary gear set. Said fourth spur gear and the internal gear of the first planetary gear set are preferably arranged coaxially or concentrically with respect to one another. It is furthermore preferable for the fourth spur gear and the internal gear of the first planetary gear set to be formed in one piece with one another. It is furthermore preferable for the fourth spur gear and the internal gear of the first planetary gear set to be understood to be a ring-shaped device/component with an external toothing (fourth spur gear) and an internal-gear toothing (internal gear of the first planetary gear set). In particular by way of a fourth spur gear connected to the internal gear of the first planetary gear set, a particularly compact construction of the vehicle gearbox can be realized.

According to the invention, a direct coupling and an indirect coupling of one of the gearwheels, in particular of the first spur gear, to the gearbox housing are made possible. A direct coupling is to be understood in the context of the invention to mean that a shift device is arranged at one side on the gearwheel, in particular on the first spur gear, and at the other side on the gearbox housing, and that said gearwheel and the gearbox housing are contactable by said shift device for the purposes of transmitting torque. In the context of the invention, an indirect coupling of one of the gearwheels to the gearbox housing is to be understood to mean a kinematic coupling of these to one another. It is preferably the case that, for such indirect coupling, a spur gear which meshes with said gearwheel, in particular a spur gear arranged concentrically with respect to the epicyclic gearbox shaft, is connectable by way of a shift device to the gearbox housing. By way of rolling contact between said gearwheel and the spur gear that meshes therewith, the gearwheel, in particular the first spur gear, is connectable indirectly to the gearbox housing by way of the shift device.

In a preferred embodiment, the fourth spur gear is connectable to at least one of the planet gear carriers of the first or second planetary gear set or to a common planet gear carrier. It is preferable for the fourth spur gear to be permanently connectable, preferably in positively locking, preferably non-positively locking and particularly preferably cohesive fashion, or by way of a combination of at least two of the abovementioned connection types, to the planet gear carrier. It is furthermore preferable for the fourth spur gear to be connectable to a planet gear carrier for the mounting of at least one of the first and one of the second planet gears. In particular by way of the permanent coupling of the fourth spur gear to one of the planet gear carriers, particularly advantageous and compact kinematics of the epicyclic gearbox are realized.

In a preferred embodiment, the planet gear carrier of the second planetary gear set is connectable to the internal gear of the first planetary gear set. It is furthermore preferable for the sun pinion/gear of the second planetary gear set to be connectable to the planet gear carrier of the first planetary gear set. In this context, the "connection" is preferably to be understood to mean a permanent connection, by contrast to the selective connection. A permanent connection is preferably to be understood to mean a positively locking, preferably non-positively locking and particularly preferably cohesive connection, or a connection with a combination of at least two of the abovementioned connection types. It is furthermore preferable for a permanent connection to be non-releasable during the intended operation of the vehicle gearbox. In particular by way of said permanent connection, a particularly space-saving and thus compact construction of the vehicle gearbox is made possible.

In a preferred embodiment, the sun pinion/gear of the first planetary gear set meshes with at least one of the first planet gears, and said planet gear preferably meshes with the internal gear of the first planetary gear set (first internal gear) or preferably with a plus planet gear. In particular by way of said kinematics, a particularly compact construction of the vehicle gearbox is made possible.

In a preferred embodiment, the epicyclic gearbox shaft is connectable, preferably permanently connectable, to at least one of the gearbox elements of the second planetary gear set. In the context of the invention, a gearbox element is to be understood to mean at least one of the sun gears/pinions, one of the internal gears and one of the planet gear carriers. The epicyclic gearbox shaft is preferably connectable to the sun gear/pinion of the second planetary gear set, preferably to the internal gear of the second planetary gear set (second internal gear) or particularly preferably to the planet gear carrier of the second planetary gear set or to the common planet gear carrier. In particular by way of said permanent coupling/connection of the epicyclic gearbox shaft to at least one of the stated gearbox elements, a particularly compact construction of the vehicle gearbox is made possible.

It is preferably the case that, by way of the second planetary gear set, drive is output in the direction of the driveable wheel/tire combination (epicyclic gearbox shaft), not to an internal gear. It is furthermore preferable for the epicyclic gearbox shaft to be connected rotationally conjointly to the internal gear of the second planetary gear set, preferably to the sun gear/pinion.

In a preferred embodiment, the vehicle gearbox has at least six shift devices, wherein these are combined in each case in pairwise fashion in torque-transmitting devices, in such a way that, in a torque-transmitting device, only one of the two shift devices is activatable (power transmission made possible). It is furthermore preferable for the vehicle gearbox to have seven shift devices. It is preferable for at least two, preferably four or particularly preferably six shift devices to be combined in each case in pairwise fashion in torque-transmitting devices, such that in each case only one of the two shift devices is activatable.

With a vehicle gearbox according to the invention, it is possible for drivetrains which are of particularly compact construction, and which are in particular also efficient, for motor vehicles to be realized.

In the context of the invention, a drivetrain is to be understood to mean a device which has at least one drive machine, preferably an internal combustion engine, preferably a reciprocating-piston engine, a vehicle gearbox according to the invention, and at least one driveable wheel, preferably multiple driveable wheels, and also means for connecting the drive machine to the vehicle gearbox and for connecting the vehicle gearbox to the driveable wheel. It is preferably the case in a drivetrain of said type that the spur-gear shaft is couplable to at least one drive machine. It is preferable for the epicyclic gearbox shaft to be designed as a drive-output shaft of the vehicle gearbox, and to output the drive power in the direction of the at least one driveable wheel. Here, in the context of the invention, a wheel is to be understood to mean a wheel-tire unit of a motor vehicle.

Other objects, advantages and novel features of the present invention will become apparent from the following

DETAILED DESCRIPTION OF THE DRAWINGS

Figures 1, 2:
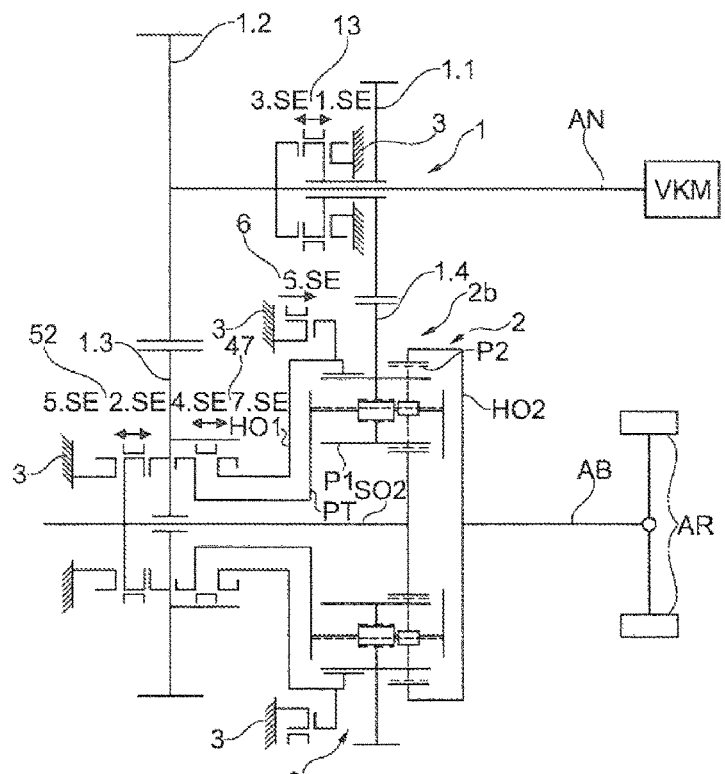
FIG. 1 is a longitudinal section through a combined seven-gearspeed vehicle gearbox according to an embodiment of the invention.
FIG. 2 is a shift diagram for a vehicle gearbox according to FIG. 1 with seven forward gearspeeds and one reverse gearspeed.

FIG. 1 illustrates a longitudinal section through a vehicle gearbox. The vehicle gearbox has a first sub-gearbox 1, which is in the form of a spur-gear gearbox, and a second sub-gearbox 2, which is in the form of an epicyclic gearbox device with two planetary gear sets 2a, 2b. The supply of power (rotational speed, torque) into the vehicle gearbox is realized via the spur-gear shaft AN, and drive is output via the epicyclic gearbox shaft AB. The first sub-gearbox 1 has a first spur gear 1.1 and a second spur gear 1.2.

The drive power (rotational speed, torque) is supplied to the vehicle gearbox, and thus to the drivetrain, by way of the internal combustion engine VKM. By way of the vehicle gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the spur-gear shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 52, in which the shift devices 5.SE and 2.SE are structurally combined, and a further torque-transmitting device 47, in which the shift devices 4.SE and 7.SE are structurally combined.

By way of the shift device 2.SE, the third spur gear 1.3 is connectable to the sun pinion shaft SO2 of the second planetary gear set 2b. By way of the shift device 5.SE, said sun pinion shaft SO2 is connectable to the gearbox housing 3. Here, the torque-transmitting device 52 is designed such that in each case only the shift device 2.SE or the shift device 5.SE is activatable. Here, the activation is to be understood to mean that a torque can be transmitted by the shift device.

By way of the shift device 7.SE, the third spur gear 1.3 is connectable to the internal gear HO1 of the first planetary gear set 2a. The internal gear HO1 is arranged concentrically with respect to the epicyclic gearbox shaft AB. By way of the shift device 4.SE, the third spur gear 1.3 is connectable to the planet gear carrier PT of the epicyclic gearbox 2 (common planet gear carrier).

Here, the torque-transmitting device 47 is designed such that either the shift device 4.SE or the shift device 7.SE is activatable.

The first planet gears P1 and the second planet gears P2 are rotatably mounted on the planet gear carrier PT. The planet gears P1 and P2 are mounted on the planet gear carrier PT such that said planet gears mesh with one another. The first planet gears P1 furthermore mesh with the internal gear HO1.

The second planet gears P2 mesh with the sun pinion SO2 of the second planetary gear set and with the internal gear of said planetary gear set HO2.

The planet gear carrier PT can be understood to be a common planet gear carrier and has a torque-transmitting device 6. The torque-transmitting device 6 has a shift device 6.SE, by way of which the planet gear carrier PT is connectable to the gearbox housing 3. If one of the gearbox elements is connected to the gearbox housing 3, specifically the sun pinion shaft SO2 by way of the shift device 5.SE, the planet gear carrier PT by way of the shift device 6.SE or the first spur gear 1.1 by way of the shift device 1.SE, said gearbox element is immobilized and has a rotational speed of zero. Through the selective coupling of said gearbox elements to the gearbox housing 3, at one side, and the selective coupling of gearbox elements to one another by way of the shift devices 2.SE, 4.SE and 3.SE, it is possible by way of said vehicle gearbox to realize one reverse gearspeed and seven forward gearspeeds. Here, the torque-transmitting devices (6, 13, 47, 52) are designed such that in each case only two shift devices (1.SE to 7.SE) are activated for one gearspeed stage (reverse gearspeed and first to seventh gearspeed).

FIG. 2 shows a shift diagram for a vehicle gearbox according to FIG. 1. In the table shown in FIG. 2, the grayed regions indicate that a shift device (1.SE to 7.SE) is activated. It can be seen from the shift diagram that in each case only two shift devices are activated for a respective gearspeed. By way of the vehicle gearbox according to the invention, seven (Gearspeed 1 to Gearspeed 7) forward gearspeeds can be realized in the main direction of travel, and one reverse gearspeed (Gearspeed R) can be realized in the opposite direction of travel.

Figures 3, 4:
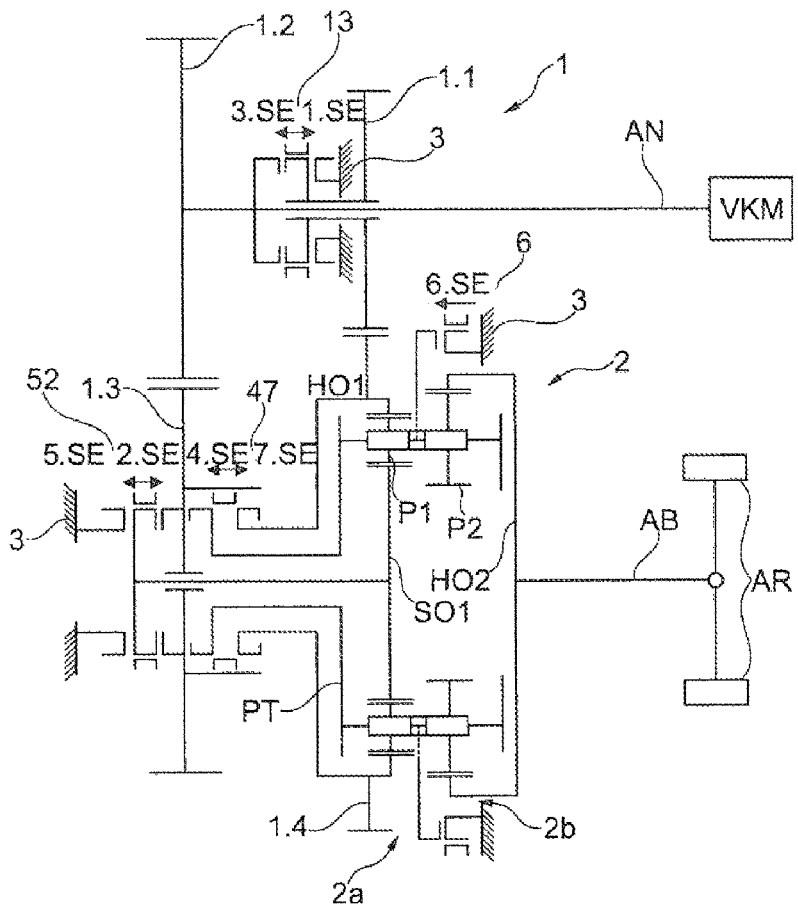
FIG. 3 is a longitudinal section through a combined seven-gearspeed vehicle gearbox according to an embodiment of the invention.
FIG. 4 is a shift diagram for a vehicle gearbox according to FIG. 3 with seven forward gearspeeds and one reverse gearspeed.

FIG. 3 illustrates a longitudinal section through a vehicle gearbox. The vehicle gearbox has a first sub-gearbox 1, which is in the form of a spur-gear gearbox, and a second sub-gearbox 2, which is in the form of an epicyclic gearbox device with two planetary gear sets 2a, 2b. The supply of power (rotational speed, torque) into the vehicle gearbox is realized via the spur-gear shaft AN, and drive is output via the epicyclic gearbox shaft AB. The first sub-gearbox 1 has a first spur gear 1.1 and a second spur gear 1.2.

The drive power (rotational speed, torque) is supplied to the vehicle gearbox, and thus to the drivetrain, by way of the internal combustion engine VKM. By way of the vehicle gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the spur-gear shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 52, in which the shift devices 5.SE and 2.SE are structurally combined, and a further torque-transmitting device 47, in which the shift devices 4.SE and 7.SE are structurally combined.

By way of the shift device 2.SE, the third spur gear 1.3 is connectable to the sun pinion shaft SO1 of the first planetary gear set 2a. By way of the shift device 5.SE, said sun pinion shaft SO1 is connectable to the gearbox housing 3. Here, the torque-transmitting device 52 is designed such that in each case only the shift device 2.SE or the shift device 5.SE is activatable. Here, the activation is to be understood to mean that a torque can be transmitted by the shift device.

By way of the shift device 7.SE, the third spur gear 1.3 is connectable to the internal gear HO1 of the first planetary gear set 2a. The internal gear HO1 is arranged concentrically with respect to the epicyclic gearbox shaft AB. By way of the shift device 4.SE, the third spur gear 1.3 is connectable to the planet gear carrier PT of the epicyclic gearbox 2 (common planet gear carrier).

Here, the torque-transmitting device 47 is designed such that either the shift device 4.SE or the shift device 7.SE is activatable.

The first planet gears P1 and the second planet gears P2 are rotatably mounted on the planet gear carrier PT. The planet gears P1 and P2 are mounted on the planet gear carrier PT such that the toothing regions thereof are axially spaced apart from one another. The first planet gears P1 mesh with the internal gear HO1 and with the sun pinion SO1. The second planet gears P2 mesh with the internal gear HO2 of the second planetary gear set.

The planet gear carrier PT can be understood to be a common planet gear carrier and has a torque-transmitting device 6. The torque-transmitting device 6 has a shift device 6.SE, by way of which the planet gear carrier PT is connectable to the gearbox housing 3. If one of the gearbox elements is connected to the gearbox housing 3, specifically the sun pinion shaft SO1 by way of the shift device 5.SE, the planet gear carrier PT by way of the shift device 6.SE or the first spur gear 1.1 by way of the shift device 1.SE, said gearbox element is immobilized and has a rotational speed of zero. Through the selective coupling of said gearbox elements to the gearbox housing 3, at one side, and the selective coupling of gearbox elements to one another by way of the shift devices 2.SE, 4.SE and 3.SE, it is possible by way of said vehicle gearbox to realize one reverse gearspeed and seven forward gearspeeds. Here, the torque-transmitting devices (6, 13, 47, 52) are designed such that in each case only two shift devices (1.SE to 7.SE) are activated for one gearspeed stage (reverse gearspeed and first to seventh gearspeed).

FIG. 4 shows a shift diagram for a vehicle gearbox according to FIG. 3. In the table shown in FIG. 4, the grayed regions indicate that a shift device (1.SE to 7.SE) is activated. It can be seen from the shift diagram that in each case only two shift devices are activated for a respective gearspeed. By way of the vehicle gearbox according to the invention, seven (Gearspeed 1 to Gearspeed 7) forward gearspeeds can be realized in the main direction of travel, and one reverse gearspeed (Gearspeed R) can be realized in the opposite direction of travel.

Figures 5, 6:
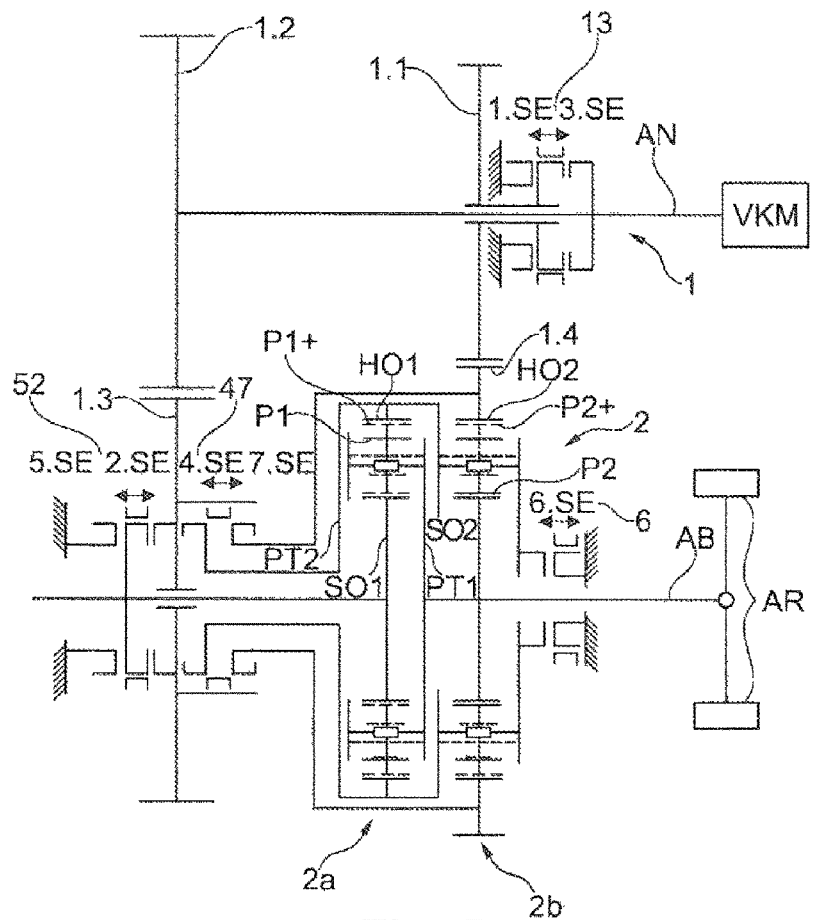
FIG. 5 is a longitudinal section through a combined seven-gearspeed vehicle gearbox according to an embodiment of the invention.
FIG. 6 is a shift diagram for a vehicle gearbox according to FIG. 5 with seven forward gearspeeds and one reverse gearspeed.

FIG. 5 illustrates a longitudinal section through a vehicle gearbox. The vehicle gearbox has a first sub-gearbox 1, which is in the form of a spur-gear gearbox, and a second sub-gearbox 2, which is in the form of an epicyclic gearbox device with two planetary gear sets 2a, 2b. The supply of power (rotational speed, torque) into the vehicle gearbox is realized via the spur-gear shaft AN, and drive is output via the epicyclic gearbox shaft AB. The first sub-gearbox 1 has a first spur gear 1.1 and a second spur gear 1.2.

The drive power (rotational speed, torque) is supplied to the vehicle gearbox, and thus to the drivetrain, by way of the internal combustion engine VKM. By way of the vehicle gearbox, the transmission ratio between the shafts AN/AB can be adapted, and the drive power can be output via the epicyclic gearbox shaft AB to the driveable wheels AR.

The first spur gear 1.1 is selectively connectable in torque-conducting fashion to the spur-gear shaft AN by way of a torque-transmitting device 13 in which shift devices 1.SE and 3.SE are structurally combined. The first shift device 1.SE is designed to connect the first spur gear 1.1 to the gearbox housing 3.

The shift device 3.SE is designed to connect the spur gear 1.1 to the spur-gear shaft AN. The spur gear 1.1 meshes with a fourth spur gear 1.4, and said fourth spur gear 1.4 is arranged coaxially with respect to the epicyclic gearbox shaft AB. The second spur gear 1.2 meshes with a third spur gear 1.3, and said third spur gear 1.3 is also arranged coaxially with respect to the epicyclic gearbox shaft AB. The third spur gear 1.3 has a torque-transmitting device 52, in which the shift devices 5.SE and 2.SE are structurally combined, and a further torque-transmitting device 47, in which the shift devices 4.SE and 7.SE are structurally combined.

By way of the shift device 2.SE, the third spur gear 1.3 is connectable to the sun pinion shaft SO1 of the first planetary gear set 2b. By way of the shift device 5.SE, said sun pinion shaft SO1 is connectable to the gearbox housing 3. Here, the torque-transmitting device 52 is designed such that in each case only the shift device 2.SE or the shift device 5.SE is activatable. Here, the activation is to be understood to mean that a torque can be transmitted by the shift device.

By way of the shift device 7.SE, the third spur gear 1.3 is connectable to the internal gear HO2 of the second planetary gear set 2b. The internal gear HO2 is arranged concentrically with respect to the epicyclic gearbox shaft AB and is formed in one piece with the fourth spur gear 1.4, ring-shaped gearwheel with internal (HO2) and external toothing (1.4). By way of the shift device 4.SE, the third spur gear 1.3 is connectable to the planet gear carrier PT2 of the second planetary gear set 2b. The first planetary gear set 2a has a dedicated planet gear carrier PT1. The internal gear HO1 of the first planetary gear set is accommodated in the second planet gear carrier PT2.

Here, the torque-transmitting device 47 is designed such that either the shift device 4.SE or the shift device 7.SE is activatable.

The first planet gears P1 and the first plus planet gears P1+ are rotatably mounted on the planet gear carrier PT1. The planet gears P1 and P1+ are mounted on the planet gear carrier PT1 so as to mesh with one another. Furthermore, the first planet gears P1 mesh with the sun pinion SO1, and the plus planet gears P1+ mesh with the internal gear HO1. The second planet gears P2 mesh with the sun pinion SO2, and drive is output via the latter to the epicyclic gearbox shaft AB. The plus planet gears P2+ mesh with the planet gears P2 and with the internal gear HO2. In this embodiment of the invention, both planetary gear sets (2a, 2b) are in the form of complete planetary gear sets (plus gearboxes).

The torque-transmitting device 6 has a shift device 6.SE, by way of which the planet gear carrier PT2 is connectable to the gearbox housing 3. If one of the gearbox elements is connected to the gearbox housing 3, specifically the sun pinion shaft SO1 by way of the shift device 5.SE, the planet gear carrier PT1 by way of the shift device 6.SE or the first spur gear 1.1 by way of the shift device 1.SE, said gearbox element is immobilized and has a rotational speed of zero. Through the selective coupling of said gearbox elements to the gearbox housing 3, at one side, and the selective coupling of gearbox elements to one another by way of the shift devices 2.SE, 4.SE and 3.SE, it is possible by way of said vehicle gearbox to realize one reverse gearspeed and seven forward gearspeeds. Here, the torque-transmitting devices (6, 13, 47, 52) are designed such that in each case only two shift devices (1.SE to 7.SE) are activated for one gearspeed stage (reverse gearspeed and first to seventh gearspeed).

FIG. 6 shows a shift diagram for a vehicle gearbox according FIG. 5. In the table shown in FIG. 6, the grayed regions indicate that a shift device (1.SE to 7.SE) is activated. It can be seen from the shift diagram that in each case only two shift devices are activated for a respective gearspeed. By way of the vehicle gearbox according to the invention, seven (Gearspeed 1 to Gearspeed 7) forward gearspeeds can be realized in the main direction of travel, and one reverse gearspeed (Gearspeed R) can be realized in the opposite direction of travel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-gearspeed vehicle gearbox, comprising:
a spur-gear gearbox with at least one first and one second spur gear arranged on a spur-gear shaft, wherein the first spur gear meshes with a fourth spur gear and the second spur gear meshes with a third spur gear;
an epicyclic gearbox with at least one first and one second planetary gear set and with an epicyclic gearbox shaft, wherein the planetary gear sets have in each case one internal gear and in each case at least one planet gear, and at least one of the planetary gear sets has a sun pinion and at least one planet gear carrier;
a gearbox housing, wherein the spur-gear shaft and the epicyclic gearbox shaft are mounted so as to be rotatable relative to the gearbox housing; and
a multiplicity of shift devices, wherein
the first spur gear is selectively connectable in torque-conducting fashion to the spur-gear shaft,
the first spur gear is selectively connectable in torque-conducting fashion to the gearbox housing,
at least one of the sun pinions is selectively connectable in torque-conducting fashion to the gearbox housing,
the third spur gear is selectively connectable in torque-conducting fashion to one of the planet gear carriers, and
the third spur gear is selectively connectable in torque-conducting fashion to the internal gear of the first planetary gear set.

2. The vehicle gearbox according to claim 1, wherein the spur-gear shaft and the epicyclic gearbox shaft are, for power transmission from and to the vehicle gearbox, designed such that said two gearbox shafts are arranged incongruently with respect to one another so as to be radially spaced apart from one another.

3. The vehicle gearbox according to claim 1, wherein the third spur gear is selectively connectable in torque-conducting fashion to one of the sun pinions.

4. The vehicle gearbox according to claim 1, wherein three of the following gearbox elements: first spur gear, first or second sun pinion, first or second planet gear carrier and first or second internal gear, are selectively connectable in torque-conducting fashion to the gearbox housing.

5. The vehicle gearbox according to claim 1, wherein at least one of the planetary gear sets has at least one first plus planet gear.

6. The vehicle gearbox according to claim 5, wherein the first and the second planetary gear set have at least one first and at least one second plus planet gear.

7. The vehicle gearbox according to claim 1, wherein the first planetary gear set has at least one first planet gear, the second planetary gear set has at least one second planet gear,
said first planet gear meshes with said second planet gear, and
said first and said second planet gear are rotatably mounted on the planet gear carrier.

8. The vehicle gearbox according to claim 1, wherein one of the planet gear carriers is selectively connectable in torque-conducting fashion to the gearbox housing.

9. The vehicle gearbox according to claim 1, wherein one of the internal gears is connectable to the gearbox housing.

10. The vehicle gearbox according to claim 9, wherein the one internal gear is the first internal gear of the first planetary gear set.

11. The vehicle gearbox according to claim 1, wherein the fourth spur gear is connectable to at least one of the internal gears.

12. The vehicle gearbox according to claim 1, wherein the fourth spur gear is connectable to at least one of the planet gear carriers.

13. The vehicle gearbox according to claim 1, wherein the planet gear carrier of the second planetary gear set is connectable to the internal gear of the first planetary gear set, and
the sun pinion of the second planetary gear set is connectable to the planet gear carrier of the first planetary gear set.

14. The vehicle gearbox according to claim 1, wherein at least one of the first planet gears meshes with one of the second planet gears, and
said second planet gear meshes with the internal gear and the sun pinion of the second planetary gear set.

15. The vehicle gearbox according to claim 1, wherein the sun pinion of the first planetary gear set meshes with at least one of the first planet gears, and
said planet gear meshes with the internal gear of the first planetary gear set or a plus planet gear.

16. The vehicle gearbox according to claim 1, wherein the epicyclic gearbox shaft is connectable to at least one of the gearbox elements of the second planetary gear set.

17. The vehicle gearbox according to claim 16, wherein the epicyclic gearbox is connectable to one of the following gearbox elements of the second planetary gear set: the sun pinion, the internal gear, or the planet gear carrier.

18. A drivetrain for a motor vehicle, comprising:
a vehicle gearbox according to claim 1, wherein
the spur-gear shaft is couplable to a drive machine,
the epicyclic gearbox shaft is couplable to a drive-output shaft, and
by way of the drive-output shaft, drive power, which is transmitted from the drive machine to the vehicle gearbox, can be transmitted in the direction of at least one driveable wheel.

* * * * *